Oct. 24, 1961 R. J. B. CLARET 3,005,352
INERTIAL GUIDANCE DEVICE
Filed Feb. 25, 1959 3 Sheets-Sheet 1

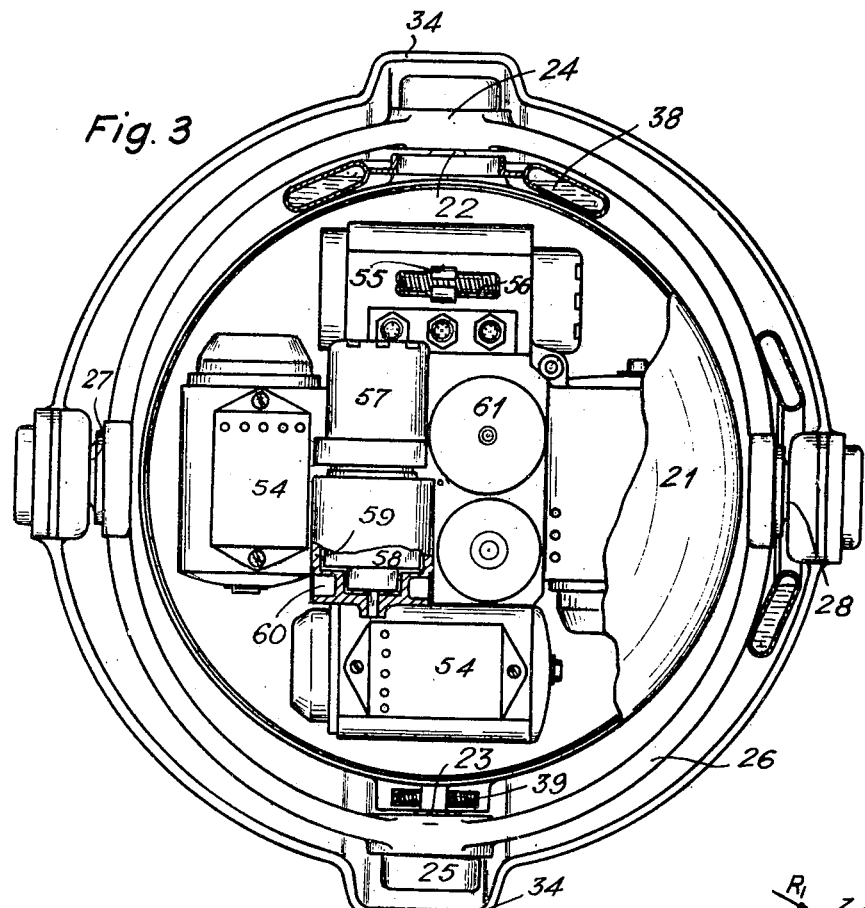

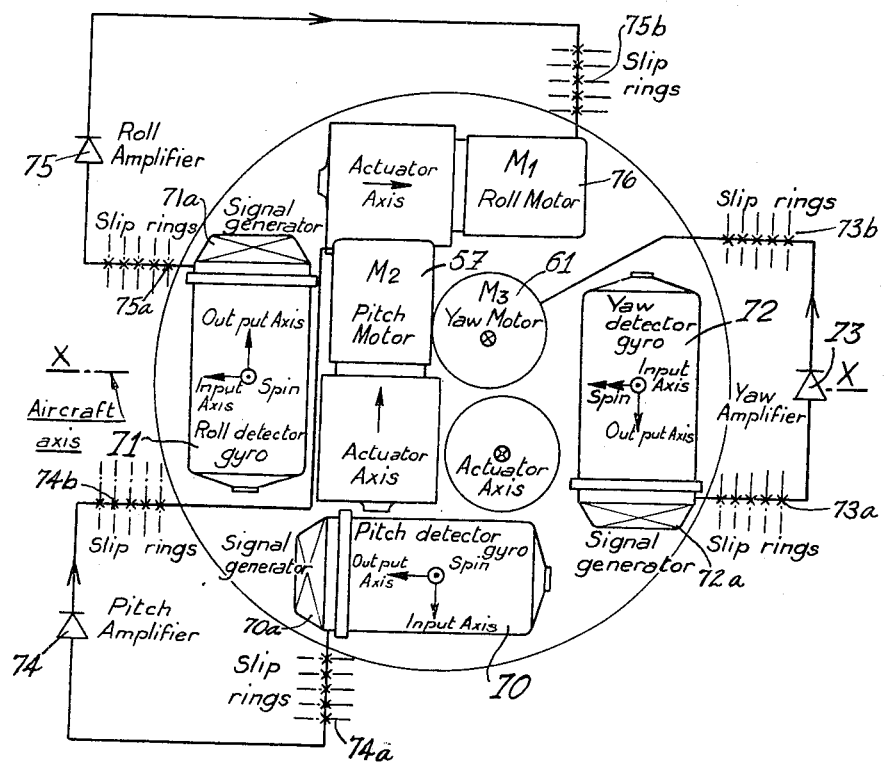

United States Patent Office 3,005,352
Patented Oct. 24, 1961

3,005,352
INERTIAL GUIDANCE DEVICE
René Jean Baptiste Claret, Sceaux, France, assignor to Societe de Fabrication d'Instruments de Mesure (S.F.I.M.), Massy (Seine and Oise), France
Filed Feb. 25, 1959, Ser. No. 795,488
Claims priority, application France Feb. 26, 1958
13 Claims. (Cl. 74—5.34)

The present invention relates to an inertial guidance device which uses simplified solutions in respect of the platform-governing members and of signal transmission, of the suspension method of said members and of the general arrangement of the controls.

Inertial guidance is based on the fact that a platform, on which are supported floating-integrating-gyroscopes, is freely suspended about a point, said platform being maintained horizontal and trained on to a given bearing by three of these gyroscopes the input axes of which are mutually perpendicular.

In arrangements resorted to hitherto, and for certain orientations of the platform relative to the guided craft, the suspension system requires the provision—due to the fact that torque motors are centred on the suspension pivots—of at least one resolver the principal role of which is to make certain computations affecting the response of the torque motors, based on the formulae applying to coordinate changing.

One of the objects of the present invention is to eliminate the role played by the resolvers, by virtue of the fact that the type of correcting torque motor used allows arranging the platform in such a way that its acting axis remains constantly parallel to the input axis of the corresponding floating-integrating-gyroscope, irrespective of the platform's position.

According to the invention, the platform is suspended about a point through the medium of a substantially central head having aligned pivots which provide for oscillation about two mutually perpendicular axes and which transfer the weight of the platform onto a fork which is itself carried on a rotating axle, said rotating axle being usually suspended from two gimbal rings interposed between the axle and the structure of the carrier vehicle.

The platform referred to above carries only three floating-integrating-gyroscopes of which two or all three are associated to accelerometers and to special torque motors of the inertial type or, if required, of the combined inertial viscous type.

Such a layout makes it possible to keep all active masses at a distance from the pivoting centre and to eliminate all suspended masses which do not directly affect the natural stability of the platform. Thus optimum use is made of a non-deformable material assembly which, in itself, already possesses a natural stability. This also provides for simplification of the overall layout of the device.

The outer gimbal rings do not participate in the dynamics of the platform, but ensure maintenance of the necessary degrees of freedom, regardless of the configuration adopted by the various supporting members.

The various pivots comprise no angle-measuring system, torque motor, or resolver. They comprise only rotary electric connecting devices of the total- or partial-rotation type, adapted to the amplitude of each particular movement.

According also to the invention, the layout of the platform and of the units it carries is such that the whole assembly is statically balanced indifferently about the central suspension point, this state of equilibrium being perfected by means, say, of balancing screws fixed to resilient collars.

The various instruments are fixed to the platform in carefully trued supports carrying setting marks. Each basic unit is calibrated separately, and the mere act of assembling them all ensures rigorously correct positioning of the relative actuation axes.

Thus, each of the two floating-integrating-gyroscopes governing roll and pitch respectively has its input axis perpendicular to the actuation axis of the coupled accelerometer, while the associated torque motor has its torque axis parallel to the gyroscope's input axis.

The input axes of the two floating-integrating-gyroscopes referred to above, which define horizontality of the platform, are thus able to be rigorously perpendicular to each other, the input axis of the directional floating-integrating-gyroscope being perpendicular to the plane defined by the two other axes.

The torque motors integral with the platform are motors associated, in each case, to a flywheel, there being interposition of reducer or multiplier gearing of suitable ratio. The inertia of this flywheel relative to the motor casing, enables the desired torque to be applied to the platform substantially during the whole of the time required for the motor to accelerate to its working regime.

It is preferable to associate to the flywheel a viscous damping type torque generator, the action of which provides for compensation of permanent torques—even subsequent to working regime being reached—while at the same time providing damping of flywheel movement during no-command periods without in any way bearing against the apparatus or creating a disturbing torque.

The invention also allows the execution of a guidance and navigation method according to which movement along an ascending trajectory, which may be a vertical one, movement along an earth-girdling trajectory and movement along a descending trajectory which may likewise be a vertical one, are imposed upon a body in motion, with periods of transition during which a programming device acts upon the controls of the guided body.

The invention further relates to guidance devices for the body in motion, which are actuated in accordance with commands given by the platform described above and which return the craft on to its trajectory solely by means of translational movements.

The following description given in respect of the accompanying drawings, provided by way of example only and not in any limiting sense, will give a clear understanding of how the invention is performed.

FIG. 3 is a plan view, also with cutaway portions, of the fittings and their platform.

FIG. 4 is a sectional view of a variant of a torque-motor flywheel.

FIG. 5 illustrates, in highly schematic fashion, the arrangement of a single platform oscillatably mounted in the carrier vehicle.

FIG. 6 is a highly schematic illustration of a carrier vehicle and its yaw and directional controls which ensure trajectory correction by imparting translational movement.

FIG. 7 shows a control of the corrective-jet type providing the same result.

FIG. 8 is a diagrammatic view of the platform together with a schematic wiring diagram and showing the various gyros, corresponding torque motors and actuating means.

Figure 1:
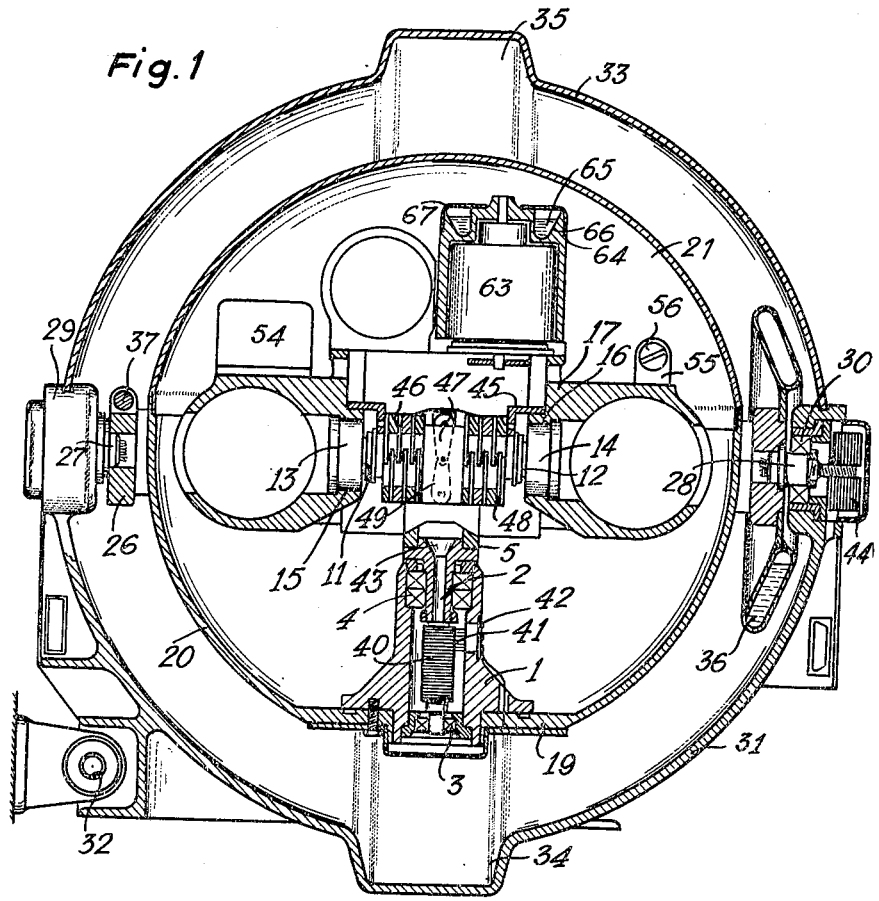
FIG. 1 is a view in elevation, together with a diametrical vertical cross-section with partial cutaway, of the guidance device.
Figure 2:
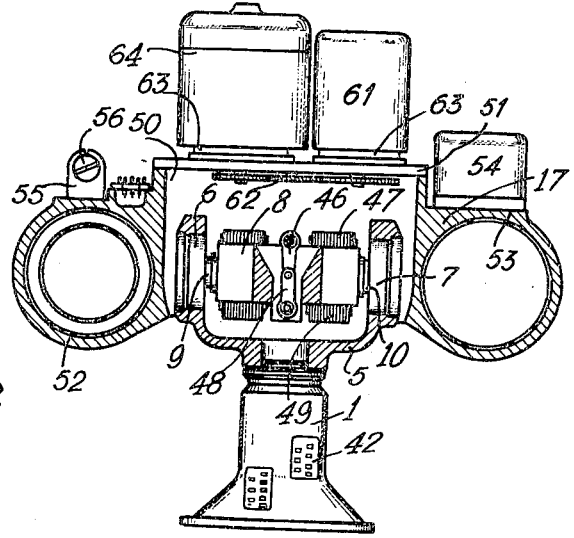
FIG. 2 is a partial view in profile, with cutaway portions, of the complete moving assembly.

The device illustrated comprises a pillar 1 within which is placed an axle 2 pivoting in roller bearings 3 and 4, this axle being integral with a fork 5 two symmetrical branches of which carry coaxial roller-bearings 6 and 7. Within these roller-bearings 6 and 7 is oscillatably mounted a head 8 each extremity of which features short journals 9 and 10 inserted into roller bearings 6 and 7. Perpendicular to the axis of journals 9 and 10, the head features further coaxial journals 11 and 12 inserted into roller-bearings 13 and 14 which are themselves housed in corresponding recesses 15 and 16 of a platform 17. This platform accordingly embodies a central hollowed-out portion to take the head 8.

Platform 17 and the units it supports are arranged so as to be statically balanced about the oscillation center constituted through the medium of the head 8, the latter's articulation points on platform 17 and its articulation points in the fork 5.

The pillar 1 is secured on an end-plate 19 forming one piece with an hemispherical bowl 20 within which the platform 17 is in free oscillation. This bowl is hermetically sealed by means of a substantially hemispherical lid 21, using shrouded jointing.

The bowl 20 is fitted with a pair of diametrically-opposed coaxial journals 22 and 23 which are inserted into roller-bearings 24 and 25 of a gimbal-ring 26. This gimbal-ring 26 is itself provided with diametrically-opposed coaxial journals 27 and 28 positioned along a diametrical axis at right angles to that of journals 22 and 23. Journals 27 and 28 are inserted into roller-bearings 29 and 30 embodied in a hollow support 31 of substantially hemispherical shape, this hollow support being provided with attachment members 32 which comprise shock-absorbers having a wide frequency-damping range, such as metal-wool type dampers, for example. The support 31 is provided with a substantially hemispherical protective lid 33. The support 31 and lid 33 each embody diametrical hollow ribs 34 and 35 circumscribed at right angles to the axis of journals 27 and 28 to allow free movement of roller-bearing heads 24 and 25 of gimbal-ring 26 inside the support and the lid.

Journal 28 is associated to an annular duct 36 containing a viscous liquid, this duct providing for external viscous damping. Journal 27 is associated to a balancing screw 37 screwed into a corresponding flexible split collar. Likewise, journal 22 is associated to an annual duct 38 containing a viscous liquid whose function is identical to that of duct 36, while journal 23 is associated to a balancing screw 39 locating with a threaded perforation in a corresponding flexible split collar.

Annular ducts 36 and 38 substantially extend in truncated-cone layers so as to take into account the requisite cross-sections, the viscous-damping torques to be obtained and the space limitations existing between the spherical envelopes and the gimbal-ring 26 mentioned previously.

Inside pillar 1, pivot 2 carries superimposed layers of conductor rings and insulating washers 40 on which bear fixed brushes 41 connected to terminal boards 42 positioned on the outside of the pillar.

The pivot 2 is hollow and protrudes through an aperture 43 between the branches of fork 5. The terminal boards 42 are connected, via electric leads (not shown) passing through hermetic seals, to a set of rotary contacts positioned on the same side as journal 23 and bearing 25. Other electric leads (likewise not shown) follow the length of gimbal-ring 26 and terminate at a similar set of rotary contacts placed on the same side as one of the journals and one of bearings 28 and 30 or 27 and 29, an electrical connection being thus provided right up to the fixed portions of the device. The rotary distributors provided on the journals comprise superimposed sets 44 of conductor rings and circular insulating plates connected to the rotating portion, and fixed brushes integral with the bearing, as the partial sectioned view in FIG. 1 illustrates.

Within the articulation of platform 17 about head 8 and the articulation of said head on fork 5 are provided, between the corresponding journals, contact blades superimposed upon each other, in alternation with suitable insulators, thus constituting articulated contacts which act as hinges. These blades comprise straight portions carrying contact nipples touching one another in pairs. As shown in FIG. 1, these sets of super-imposed blades are supported by brackets 45 integral with platform 17, these sets of blades comprising contact blades 46 integral with said brackets 45, and further contact blades 48 integral with the head 8. Similar sets of blades 47 and 49 are interposed between the head and the fork. Such hinged contacts are entirely adequate in the platform articulation, since angular movements of the platform in relation to its pivoting axis 2 are limited mechanically and are of very small magnitude during normal operating conditions.

All these electrical contacts serve to feed the various units carried by the platform 17 with a minimum degree of friction. These units consist of three assemblies, each comprising a floating-integrating-gyroscope associated to an accelerometer and to a torque motor, which may be of the combined inertial/viscous type.

The floating-integrating-gyroscopes as well as the accelerometers are well-known per se, and hence require no further description. The common characteristic which they must possess is that of high-quality performance.

The platform features reference flanges such as designated by numeral 52, designed to take, on the carefully trued bearing portions, the casings of the units referred to previously on which are inscribed setting marks (of any kind and not shown). This platform likewise features carefully trued flat bases such as that designated by numeral 53, on which are mounted the accelerometers 54. The platform also comprises resilient nuts 55 into which are screwed the balancing screws 56.

The horizontal inertial/viscous-damping torque motors are similar to that designated by numeral 57 and control, via a mechanical reducer or multiplier gearing 58, a bell-shaped coaxial flywheel 59 which shrouds the mechanism 58, while, should it be required to compensate for a permanent couple, this flywheel is provided with an annular duct 60 capable of containing a certain quantity of viscous liquid. The vertical-axis torque motor 61 is coupled, via a train of gears 62, to the axle of a reducer or multiplier device 63 shrouded by a vertical flywheel 64 which is likewise bell-shaped. The motor 61 and the mechanism 63 are mounted on a plate 51, the drive-transmitting train of gears 62 being located underneath this plate.

Should it be necessary for the vertical-axis flywheel to include an internal viscous-damping device, the upper portion of bell 54 can be hollowed out to form a groove 65 the outer wall 66 of which is made to slope outwards, this groove being enclosed over its top portion by a sealing lid 67.

Should it be required for the torque generated by the viscous liquid contained in a flywheel of the type described above to be more powerful, it is possible to resort to a pendular form of assembly wherein a mass 101 travels inside an annular duct 102 provided within the flywheel 103, this mass being in the shape of a toroidal sector of appropriate profile and mass. A viscous liquid 104 wets the inner walls of duct 102 and the surface of mass 101. This liquid provides a viscous link between the flywheel and the pendulum which consists of the mass 101 suspended via an arm 105 rotating freely about its support/bearing 106 on the hub 107 of the flywheel. When the flywheel rotates at a certain speed, it drags along the mass 101 in rotation with it, and balancing is achieved for an angular deviation such that the restoring torque generated by the mass is equal to the viscosity torque developed. A mechanical stop 108 bearing against the casing, for example, restricts, in association with stops 111, movement of pendulum 101 to that range over which its arm is in a horizontal position and its efficiency greatest. Viscous action is thus limited to this value when the flywheel rotates at greater speeds.

The shape imparted to the edge of the aperture 109—in the form of a gutter 110—ensures sealing for the annular duct containing the linking viscous liquid and dispenses with the need for a rubbing seal.

The platform is laid out to take three floating-integrating-gyroscopes the input axes of which are orientated in three mutually perpendicular directions, one such direction being maintained vertical and parallel to pivot 2 by means of a Schuler-type mounting. Platform 17 is thus defined as a horizontal platform. In addition, it is orientated for azimuth by the action of the gyroscope having a vertical input axis acting as direction gyroscope. Such a platform 17 is represented in the diagrammatic view of FIG. 8, in which the detecting gyros generally include a gyro 70 for detecting the pitch, a gyro 71 for detecting the roll, and a gyro 72, for detecting the yaw movements, for example. The vertically maintained direction is the same as the direction of the input axis of gyro 72. Each gyro is associated with an electric signal generator 70a, 71a and 72a. The signal generator 70a is electrically connected through the flexible connections or slip rings 73a of the type hereinbefore described and represented in 40, 41, 44 and 46 to 48, to a yaw amplifier 73 responsive to the generator 72, and such amplifier 73 is electrically connected through the flexible connections or slip rings 73b to the corresponding correcting yaw motor 61. Similar elements are represented in FIG. 8 for the purpose and function of correcting the pitch and roll, relative to an aircraft axis X—X, for example. A pitch amplifier 74 is coupled between generator 70a and the pitch motor 57 by means of slip rings 74a and 74b. A roll amplifier 75 is coupled between generator 71a and the roll motor 76. This platform is suspended by its middle through the medium of the head 8 and the fork 5, which offers the advantage of keeping all active masses at a distance from the pivoting centre, while at the same time eliminating all inactive suspended masses (such as the gimbal rings) which do not directly contribute to the natural stability of the platform. This enables optimum use to be made of the non-deformable interlocked masses on the platform as an initial natural stabilizing element.

Movement of any carrier vehicle to which support 32 may be connected is wholly unrestricted in relation to the platform, thanks to the bowl 20 and the gimbal-ring 26, since this link between the platform and its vehicle provides five degrees of freedom, due to the fact that neither the bowl nor the gimbal ring are affected by the dynamics of the platform. The bowl and the gimbal ring may be provided with a slight degree of under-slinging in order to place axle 2 in a substantially vertical and centered location in relation to the angles of oscillation authorized by the head 8. They may also be controlled by a programming device.

It should be noted that correct functioning of this guidance platform requires no torque-generating device, no angle-measuring system and no resolver in the central support or the external gimbal pivots of the platform. Only the indispensable rotary commutators are housed in these pivots. Such commutators may in any case often be replaced by flexible leads. Resorting to this solution allows a reduction in size for the central pivot and its various articulations, and overcomes the difficulty arising from the need to create couples directed along the suspension axes for certain gimbal-ring arrangements.

Distribution of the fixed units on the platform is such that the latter is in indifferent static equilibrium about the central suspension point, this equilibrium being achieved by means of screws such as that designated by numeral 56.

Each floating-integrating-gyroscope is arranged so that its input axis shall be perpendicular to the actuation axis of the accelerometer associated to it for each Schuler function, while the associated torque motor has its torque axis parallel to the input axis of the gyroscope.

In addition, the input axes of the two floating-integrating-gyroscopes which define horizontality of the platform are rigorously perpendicular to each other, the input axis of the directional floating-integrating-gyroscope being perpendicular to the plane defined by the other two axes.

The torque motors associated to the reducers or multipliers and to the inertia flywheels immediately generate correcting torques by reaction against the mass of their own flywheels, the desired result being obtained by the torque reaction tending to overturn the motor casing connected to the platform. When interposed multipliers are used, these effects are obtained for an entirely adequate space of time, this space of time being substantially that which separates the moment when the motor is started from that at which the motor has accelerated to its working regime. Conversely, should it be required to dispose of more powerful torque, the mechanism must be arranged to provide reduction; the active period will then be short-lived but will generally suffice. Thus, a direction of torque action is obtained which is independent of any form of thrust on journals, and which is constantly parallel to the rotation vector being monitored, this in turn doing away with the need for resolvers. Compensation for the permanent torques is obtained solely through the medium of the viscous liquid contained in the grooves embodied in the flywheels or, again, in combination with the action of the underslung masses; for indeed, as the result of the effect of gravitation or centrifugal force, or both at once, the viscous liquid or the masses displaced during a movement exert a reaction which is constantly available for use.

Such a viscosity torque-generator has the added advantage, when associated to the inertia flywheel, of acting as a speed damper for the flywheel during no-command periods, thus tending to cancel the flywheel's speed, thereby restoring to it its capacity for effective action without bearing against the apparatus and hence without creating any disturbing torques. Where it is desired to obtain greater permanent torques, use must be made of the viscous pendulum in the manner described hereinabove.

The platform constructed in this manner is thus capable of maintaining a position which is horizontal and which is orientated to follow a circumterrestrial course, thanks to the action of the third floating-integrating-gyroscope acting as a directional gyroscope, subject of course to the introduction of the appropriate corrective factors formulated in associated ancillary computers, such corrective factors involving, for instance, curvature of the earth and the latter's rotation. The platform alone is therefore able to work out the distance travelled along the planned course and the off-course distance, such data being intended to provide a check on the designed range and guidance characteristics of the platform's carrier vehicle. For indeed in this vital role, the platform is able to ensure correct positioning of the planned-path- and off-course- accelerometers; thus it fulfils both its guidance and navigational functions.

It was only natural to wish to use the stability of the platform to ensure, in addition, the stability of the carrier vehicle over its trajectory.

This extra role cannot be filled directly by the platform referred to precedingly, in the simplified form described above. For it is neither easy in practice nor an elegant solution to materially formulate, with a useful degree of accuracy, angles relating to the flight attitude of the vehicle in relation to the platform.

However, the problem of achieving stabilized flying attitude for the carrier vehicle can be correctly solved in the following way, in conjunction with the platform and by using the basic data which it formulates, the magnitudes of which can be intercepted externally without the need for an extra transmitting member.

The vehicle may itself be considered as a veritable platform suspended in space without mechanical means of support and with no restrictions on amplitude of movement, if it is equipped with three floating-integrating-gyroscopes to detect rotations about the roll, pitch and yaw axes, and if due note is taken of the fact that the controls and their actuators correspond to torque motors the actuation axes of which remain linked to the detection axes as in the case of the platform itself. Outgoing commands from the gyroscopes provide closed-circuit control over the vehicle's controls and confer upon it the stability of a drifting space platform.

The role of the monitoring units varies according to the position of the vehicle's axis in flight.

It is proposed now to consider the most general case involving a body in motion launched in a substantially vertical direction and which, obeying the commands of a programming device, pitches over until its trajectory and its axis lie horizontal at a certain altitude, to later resume a vertical position, this time nose-down, after a predetermined disance has been covered.

To avoid unnecessary complications, it is vital to prevent the body in motion from rotating about its axis while in flight. This is an inescapable requirement to avoid thwarting of controls.

This particular form of stability is provided by the action of the roll gyroscope and the controls acting about the roll axis of the body in motion. During the immediate post-launch phase and the vertical ascending part of the flight, duration of which is relatively short in comparison with the total trajectory, the action of the body's roll gyroscope is certainly adequate if it is assumed that a high-quality instrument comparable to those on the platform is being used, having a drift characteristic of less than $\frac{1}{10}°$ per hour, for instance. Furthermore, during this phase, the platform floating-integrating-gyroscope which is placed in a corresponding attitude, and which is that controlling the direction of the plane of the circumterrestrial trajectory, operates under the same conditions as the moving body's roll gyroscope. Thus there is no need to establish a link between these two instruments, apart possibly from using them according to the coupled-mean technique.

Directional stability of the body's axis is provided by the two pitch and yaw gyroscopes connected to the body in motion. The assumed low drift characteristic of these instruments is normally adequate to ensure good stability during the short time required for vertical flight.

Under the influence of a programming device which may itself receive, if need be, information about the speed and altitude of the body, a command is transmitted to the body's pitch gyroscope and causes progressive pitchover of the body's axis along a planned trajectory until it reaches the horizontal.

At this stage, the stability controls operate as follows:

Stability about the roll axis, which is always necessary, is taken over by the body's roll gyroscope. However, in contradistinction to what has been stated above with reference to vertical flight, it is possible to control drift in the roll gyroscope for long-duration flights by maintaining the platform horizontal, thus conferring upon it the stable character of a Schuler's pendulum.

Such control can be achieved, for example, by means of an optical detector giving the drift angle of the transverse axis with respect to the platform in the form of an electric signal acting upon the roll gyroscope's torque motor.

A similar procedure can be adopted for maintenance of the longitudinal axis.

In the case of yaw, possible lateral deviations resulting either from the action of a side wind or from a deviation off the azimuth angle, are compensated for by the transverse accelerometer's dual integrating action, and the requisite command from this accelerometer will restore the longitudinal axis of the body in motion onto the line of flight.

Another combination of the available means involves pursuing the idea which naturally comes to mind to make the body in motion itself play the part of a Schuler's platform by also considering it as a platform.

To this end, if further consideration be given to the three stabilizing gyroscopes which had to be installed on a support connected to the body in motion, and if the equipment on this support be supplemented by two accelerometers—the whole assembly being arranged on this support in an identical fashion adopted for the platform—it will be found possible to effect the connections between the accelerometers, the acceleration integrator and the torque motor of the corresponding floating-integrating-gyroscope, on the one hand, and between the detector and torque motor of the corresponding platform (i.e. the corresponding control of the body), on the other. Under such conditions, if the body in motion is assumed to be in a vertical position during the vertical part of its trajectory, then, by virtue of the fact that its whole may be likened to an orientated Schuler's platform—with integrated corrections as mentioned precedingly—its axis will remain vertical according to the Schuler's concept, while roll will be stabilized by the directional unit orientated towards the objective.

Should any cause, such as a wind or Coriolis acceleration, result in a lateral drift of the otherwise vertical axis of the body out of the vertical line over the launch point, the deviation accelerometer and planned-course accelerometer will integrate the components of this deviation, thus enabling it to be corrected.

It is usually possible to dispense with this correction, owing to the relatively short duration of this phase. Should it be applied, however, it will be necessary, as stipulated below, to resort to control systems capable of aligning the otherwise vertical axis of the body on to the vertical line rising from the point of launch, without in any way affecting the body's heading.

At the end of the ascending vertical phase, it will be necessary for the programming device to command pitchover of the body's longitudinal axis about its pitch axis, with the former remaining rigorously along the plane of the trajectory, this plane being that formed by the vertical line rising from the point of launch and the objective.

This command will be obtained by the programming device, causing the support carrying the floating-integrating-gyroscopes and the accelerometers to pivot, in relation to the body in motion, in an opposite direction (restricted to 90°), about an axis parallel to the pitch axis. To this end, the support A carrying the instruments is mounted on journals parallel to the pitch axis B (see FIG. 5).

The axis of the body in motion will henceforth be horizontal, the support A remaining horizontal and orientated. During the period of transition, the pitch gyroscope retains control over the pitch controls (nose-up, nose-down), the roll gyroscope transmits its commands, transisting progressively from the directional controls to the roll controls, while the directional gyroscope progressively switches its commands from the roll controls to the yaw controls.

This switching of functions can be achieved by methods well-known per se (such as by the use of potentiometers and transformers, resolvers, or the like). After the period of transition, the Z—Z axis of the body is horizontal. The body in motion C is once more linked to the stability of the platform A, there being Schuler's verticality plus directional control (with integration of the conventional corrections).

Should any deviation from the plane of the X—X trajectory take place (the body in motion being then on a line X'—X'), then the deviation accelerometer will effect the necessary integration and transmit an appropriate command to the restoring controls, which will in turn fetch the body back into the plane containing the circumterrestrial trajectory of zero deviation, this restoring action being accomplished by a bodily translational movement of the vehicle, without in any way affecting the direction of its axis Z—Z.

Such controls can be obtained for example by providing directional control surfaces D mounted in canard configuration and tending to swing the nose of the body towards the circum-terrestrial plane X—X, this tendency for the longitudinal axis of the body to pivot about the yaw axis being immediately compensated for by appropriate action of the yaw controls E set in motion by the directional gyroscope. Controls of this sort can utilize rocket jets J (see FIG. 7) having directing reactions acting perpendicularly to the longitudinal axis of the vehicle, such rocket jets being similar to those currently in service to ensure vertical stability during the slow-speed climb phase immediately following launch, when conventional aerodynamic controls are not yet effective. The result of this automatically combined positioning of the canard control-surface D and the normal directional control-surface E is that a lateral thrust R is created which is the resultant force of the thrusts $R_1$ and $R_2$ of the respective control surfaces, this resultant force R providing compensation for the perturbing phenomenon and returning the body into the plane of the planned trajectory X—X while at the same time maintaining its axis Z—Z parallel to its original position.

At the end of the trajectory, a programmed sequence opposite to that having resulted in pitchover will initiate descent of the body, which may take place vertically.

It is to be clearly understood that still further modifications can be made to the embodiments described hereinabove without departing from the scope of the invention.

What I claim is:

1. In an inertial guidance device, in combination, a platform, a plurality of movement detecting devices mounted on said platform for detecting the motions of said platform, a corresponding plurality of movement correcting inertia torque motors mounted on said platform for correcting the detected motions of said platform, and a free punctual swivel joint support of said platform, being disposed in the vicinity of the centre of gravity of the assembly of said platform and detecting devices and correcting inertia torque motors hereupon mounted.

2. In an inertial guidance device, in combination, a platform, a plurality of movement detecting devices mounted on said platform for detecting the motions of said platform, a corresponding plurality of movement correcting inertia torque motors mounted on said platform for correcting the detected motions of said platform, a head, a first pair of aligned journals on said head, bearings on said platform encompassing said head journals, a second pair of aligned journals on said head, a fork having bearings encompassing said second head journals, the directions of said first and second aligned journals being perpendicular, an axle supporting said fork, the direction of which is perpendicular with the plane formed by the directions of said first and second pairs of journals, and a bearing rotatably supporting said axle, said head being disposed in the vicinity of the centre of gravity of the assembly of said platform and detecting devices and correcting inertia torque motors hereupon mounted.

3. In an inertial guidance device, in combination, a platform, a plurality of movement detecting devices mounted on said platform, a corresponding plurality of movement correcting inertia torque motors mounted on said platform, a free punctual swivel joint support of said platform, being disposed in the vicinity of the centre of gravity of the assembly of said platform and detecting devices and correcting inertia torque motors hereupon mounted, and a gimbal ring suspension supporting said free punctual swivel joint.

4. In an inertial guidance device, in combination, a platform, a plurality of devices mounted on said platform for detecting the motions of said platform, a corresponding plurality of inertia torque motors mounted on said platform for correcting the detected motions of said platform, and a free punctual swivel joint support of said platform, being disposed in the vicinity and over the centre of gravity of the assembly of said platform and detecting devices and correcting motors hereupon mounted, whereby giving, at rest, to said platform, a pendular stability.

5. In an inertial guidance device, in combination, a platform, three floating-integrating-gyroscopes, mounted on said platform, the axes of said three floating-integrating-gyroscopes being placed by pairs perpendicular to each other, three inertia torgue motors mounted on said platform, having correction directions corresponding to action directions of said floating integrating gyroscopes, a free punctual swivel joint, being disposed in the vicinity of the centre of gravity of the assembly of said platform, floating-integrating-gyroscopes and inertia torque motors hereupon mounted, and electrical deformable junctions, for transmission to said floating-integrating-gyroscopes and said inertia torque motors over said free punctual swivel joint.

6. Inertial guidance device, according to claim 1, in which one torque-motor at least is provided with a fly-wheel.

7. Inertial guidance device, according to claim 1, in which one torque-motor at least is provided with a fly-wheel, with a multiplying gear between said motor and said fly-wheel.

8. Inertial guidance device, according to claim 1, in which one torque-motor at least is provided with a fly-wheel, with a reduction gear between said motor and said fly-wheel.

9. Inertial guidance device, according to claim 1, wherein one torque-motor at least is provided with a fly-wheel, said fly-wheel comprising an internal viscous damper.

10. Inertial guidance device, according to claim 1, wherein one torque-motor at least is provided with a fly-wheel, said fly-wheel comprising an internal viscous and pendular damper.

11. Inertial guidance device, according to claim 1, wherein a direction correcting torque-motor is provided with a fly-wheel the rotation axis of which is vertical, comprising a viscous internal damper constituted of an annular duct, partially filled with a viscous liquid, the external wall of which slopes downwardly.

12. In an inertial guidance device, in combination, a platform, plurality of movement detecting devices mounted on said platform, a corresponding plurality of inertia torque motors mounted on said platform for correcting movements detected by said devices, a corresponding plurality of accelerometers, the operative axes of which are respectively the same as those of said detecting devices, and a free punctual swivel joint support for said platform disposed in the vicinity of the centre of gravity of the assembly of said platform and detecting devices and correcting motors hereupon mounted.

13. In an inertial guidance device, in combination, a platform, three floating-integrating gyroscopes, mounted on said platform, the operative axes of said floating-integrating-gyroscopes being arranged perpendicular to each other, three torque-motors on said platform each provided with an internally viscous damping device, three accelerometers the operative axes of which are in the axes arrangement as the same of said floating-integrating-gyroscopes, a head disposed internally to said platform, a first pair of aligned journals forming part of said head and comprised in bearings forming parts of said platform, a second pair of aligned journals forming part of said head, comprised in bearings forming part each of a branch of a fork, said pairs of journals having perpendicular directions, an axle supporting said fork freely rotatably mounted in a bearing, electrical pivoting contacts being concentrically disposed relatively to each journal, electrical rings and brushes being concentrically disposed relatively to said axle, a support for said bearing of said axle forming the bottom of a complete and tight housing for said platform, two aligned external journals forming part of said housing, two bearings for said journals, forming parts of a gimbal-ring surrounding said housing, two aligned external journals forming part of said ring, perpendicularly disposed with respect to said first pair of external journals, a corresponding pair of bearings for said ring journals, viscous damping means associated with said external journals and said ring journals, electrical rings and brushes associated with said external and ring journals, a second external housing surrounding the assembly of the first one, the gimbal ring and associated journals and bearings, and damped supporting means for said second external housing.

References Cited in the file of this patent

UNITED STATES PATENTS

| | | |
|---|---|---|
| 1,501,886 | Abbot | July 15, 1924 |
| 2,752,793 | Drapper | July 3, 1956 |